United States Patent
Foster et al.

(10) Patent No.: US 8,394,496 B2
(45) Date of Patent: Mar. 12, 2013

(54) SINGLE PACK LOW TEMPERATURE BAKE COATING COMPOSITION

(75) Inventors: Michael D. Foster, Jamestown, NC (US); Nellie M. Moretz, Archdale, NC (US); George A. Sparks, High Point, NC (US); Willette D. Crosby, High Point, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 376 days.

(21) Appl. No.: 12/663,267

(22) PCT Filed: Jun. 6, 2007

(86) PCT No.: PCT/US2007/070545
§ 371 (c)(1),
(2), (4) Date: Jan. 15, 2010

(87) PCT Pub. No.: WO2008/150294
PCT Pub. Date: Dec. 11, 2008

(65) Prior Publication Data
US 2010/0178494 A1    Jul. 15, 2010

(51) Int. Cl.
*B32B 27/40* (2006.01)
(52) U.S. Cl. .......... 428/336; 428/424.6; 428/424.8; 428/427.7; 428/412; 428/423.1; 428/425.1; 428/335
(58) Field of Classification Search .......... 428/336, 428/424.6, 424.8, 427.7, 412, 423.1, 425.1, 428/335
See application file for complete search history.

(56) References Cited

U.S. PATENT DOCUMENTS

| | | |
|---|---|---|
| 4,683,260 A | 7/1987 | Wickert |
| 4,855,164 A | 8/1989 | Burkholder et al. |
| 4,983,662 A | 1/1991 | Overbeek et al. |
| 5,288,804 A | 2/1994 | Kim et al. |
| 5,399,383 A | 3/1995 | Mass et al. |
| 5,541,251 A | 7/1996 | Bontinck et al. |
| 5,777,022 A | 7/1998 | Bugajski et al. |
| 6,225,402 B1 | 5/2001 | O'Callaghan et al. |
| 6,277,912 B1 * | 8/2001 | Ashihara et al. ............ 525/65 |
| 6,451,873 B1 | 9/2002 | Stone et al. |
| 7,163,981 B2 | 1/2007 | Kubish et al. |
| 2005/0131151 A1 | 6/2005 | Menovcik et al. |
| 2006/0003085 A1 | 1/2006 | Takahashi et al. |
| 2006/0051513 A1 | 3/2006 | Jackson et al. |
| 2006/0122330 A1 * | 6/2006 | Wu et al. ............ 525/127 |

FOREIGN PATENT DOCUMENTS

EP          0 648 794 B1    8/1998
WO    WO 2004/026918 A1    4/2004

OTHER PUBLICATIONS

Koleske et al., *Two Thousand Three Additives Guide*, Paint and Coatings Industry, pp. 12-86, (Apr. 2003).
Product Bulletin, *AROLON® PW-5000*, Reichhold, 5 pages, (Oct. 2006).
"Coatings, JONCRYL® Selection Guide", BASF, The Chemical Company, 6 pages, (2006).
Product Data Sheet, "*Diacetone Acrylamide (DAAM)*", Kyowa Hakko Chemical Co., Ltd., 2 pages, (2004).
Product Data Sheet, "*Heloxy™ Modifier 48*", Resolution Performance Products, 2 pages, (Mar. 2005).
Product Data Sheet, "*NeoCryl A-1127*", DSM NeoResins, Inc., 2 pages, (May 15, 2002).
Product Data Sheet, "*NeoCryl A-6115*", DSM NeoResins, Inc., Bulletin A-6115, 8 pages, (Jan. 2006).
Product Data Sheet, "*NeoCryl XK-98*", DSM NeoResins, Inc., Bulletin XK-98, 5 pages, (Jan. 2006).
Product Bulletin, *WATERSOL® PW-5000*, Reichhold, 5 pages, (Sep. 2004).
Technical and Product Information Sheets, "*Welcome to Quaker Color—Specialty Chemicals*", Quaker Color, 3 pages.
"*Fine Chemicals / Fine Polymers / Plastics*", Toyo Kasei Kogyo Co., Ltd., 9 pages, downloaded from the Internet Archive at: http://web.archive.org/web/20051126040407/http://www.toyokasei-kogyo.co.jp/global/products/index.html (Nov. 26, 2005).
"*Water-based Acrylate Dispersions for coatings on wood, plastic, cork and metal*", Alberdingk Boley, Inc., 6 pages, (Apr. 2007).

* cited by examiner

*Primary Examiner* — Robert D. Harlan
(74) *Attorney, Agent, or Firm* — IPLM Group, P.A.

(57) ABSTRACT

Substrates prone to heat distortion may be coated with a coating composition containing chlorinated polyolefin-modified acrylic latex emulsion, polyurethane dispersion, non-gelling self-crosslinking acrylic emulsion, and glycol-based solvent. The coating composition contains sufficient non-gelling self-crosslinking acrylic emulsion and glycol-based solvent so that a 0.1 mm wet thickness layer of the coating composition will form a tack-free film when heated at 65° C. for fifteen minutes, and the glycol-based solvent is selected so that the coating composition is shelf stable.

28 Claims, 1 Drawing Sheet

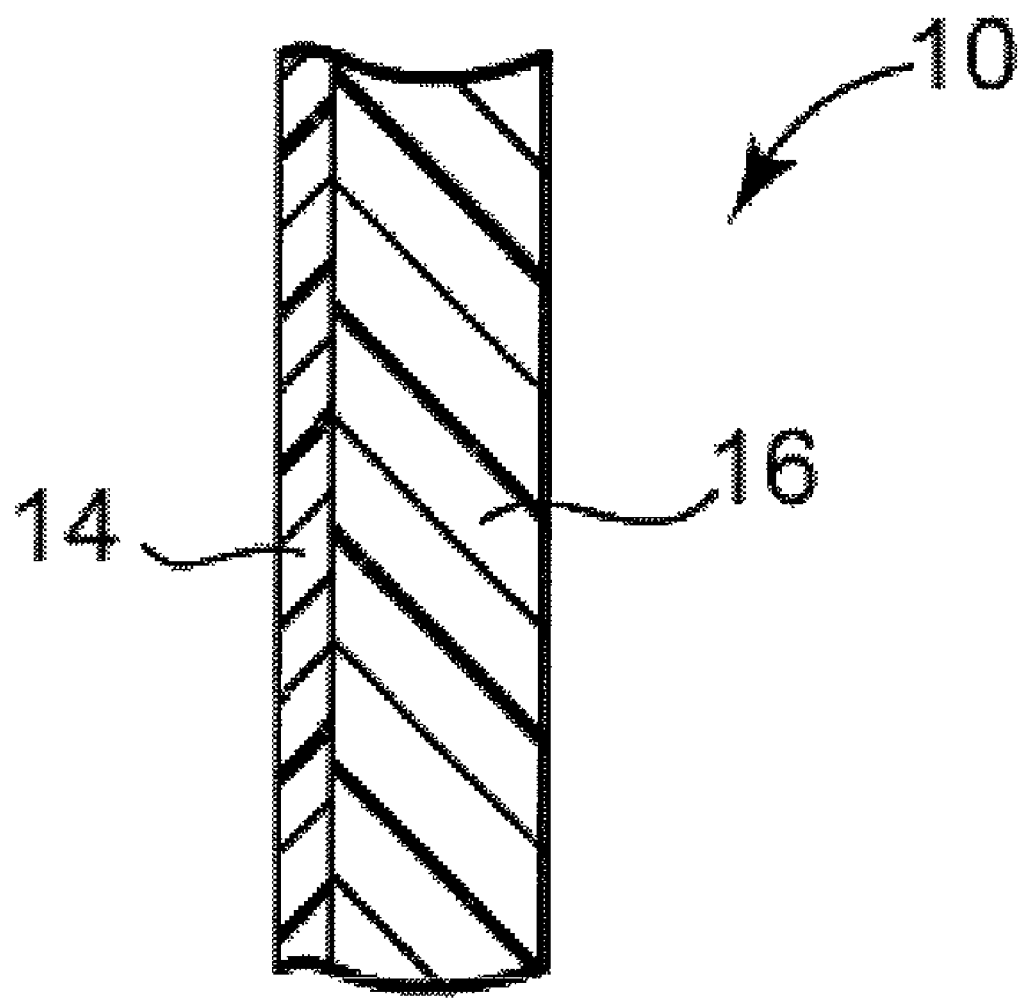

SINGLE PACK LOW TEMPERATURE BAKE COATING COMPOSITION

CROSS REFERENCE TO RELATED APPLICATION

This application is a National Stage filing of International Application No. PCT/US2007/070545 filed on Jun. 6, 2007, the disclosure of which is incorporated herein by reference.

FIELD

This invention relates to coatings for hard plastics and wood substrates.

BACKGROUND

Industrial paints and coatings must satisfy a number of competing requirements. For example, the hardened or cured coating may require a glossy appearance, solvent resistance, or resistance to detergents or other alkaline treatments. Some previously-employed coating systems have become unacceptable for environmental reasons, such as their excessive emissions of solvents now classified as volatile hazardous air pollutants (VHAPs) or volatile organic compounds (VOCs). Coatings applied to plastics may need to be dried or cured in an oven so that the coated parts can be quickly processed and shipped or stored. The dried or cured coating may also require good blocking resistance, especially when freshly-coated parts must be stacked together, or when coated parts must be shipped in conditions (e.g., inside tractor trailers) which may expose the coated parts to elevated temperatures. For some applications such as plastic molding manufacture, coated plastic parts or stock are deliberately bent or otherwise deformed (sometimes with the assistance of heat) in a subsequent manufacturing step. In such instances the coating should remain sufficiently well-adhered to the plastic substrate so that the coating preserves its functional and appearance features after the deformation step.

Wood-frame windows and other wooden architectural elements that will be exposed to outdoor conditions are often protected by the manufacturer by dipping or otherwise treating the wood with a preservative containing wax, mildewcide and other ingredients. The thus-coated pieces are dried and then topcoated with a clear or sometimes pigmented stain or paint. The wax in the preservative can make it difficult for the topcoat to adhere well to the treated wood substrate.

From the foregoing, it will be appreciated that what is needed in the art are coating compositions that will adhere well to hard plastics and to wood treated with wax-containing preservatives. Such compositions and methods for their use are disclosed and claimed herein.

SUMMARY OF THE INVENTION

Many of the solvents used in early coating compositions provided improved "bite" that materially aided coating adhesion. Removal or replacement of such solvents with alternative materials may cause the resulting coating to fail customer adhesion requirements. This loss of adhesion may be compensated for to some extent by adding one or more surfactants to the coating composition, but doing so may also unduly reduce the chemical resistance of the thus-modified coating.

Reichhold Inc. supplies a chlorinated polyolefin-modified acrylic emulsion (now called AROLON™ PW-5000) said to have low VOC levels and excellent adhesion to polypropylene and thermoplastic olefin substrates. The manufacturer recommends inclusion of a coalescing solvent and use of a 30 minute bake cycle at 80° C. (176° F.) in order to obtain good film formation and substrate adhesion. The recommended 80° C. oven temperature can undesirably deform polyvinyl chloride (PVC), a widely-used material for exterior architectural elements. A practical upper oven temperature limit for drying or curing coatings on PVC and many other plastics is about 65° C. (150° F.).

The present invention provides, in one aspect, a coating composition comprising a mixture of:
  a) chlorinated polyolefin-modified acrylic latex emulsion,
  b) polyurethane dispersion,
  c) non-gelling self-crosslinking acrylic emulsion, and
  d) glycol-based solvent,
wherein the composition contains sufficient non-gelling self-crosslinking acrylic emulsion and glycol-based solvent so that a 0.1 mm wet thickness layer of the composition will form a tack-free film when heated at 65° C. for fifteen minutes, and the glycol-based solvent is selected so that the coating composition is shelf stable. The disclosed compositions have particular utility for coating thermally-sensitive plastic substrates (e.g., plastics having low deflection or melting temperatures). The disclosed compositions may also be used on other substrates including higher deflection temperature plastics and wood, especially woods treated with waxy preservatives.

The invention provides, in another aspect, a coated article comprising a substrate having thereon a hardened continuous coating obtained from a shelf stable mixture of chlorinated polyolefin-modified acrylic latex emulsion, polyurethane dispersion, non-gelling self-crosslinking acrylic emulsion, and glycol-based solvent.

The invention provides, in yet another aspect, a method for coating plastic or wooden substrates, which method comprises:
  a) applying to the substrate a layer of a shelf stable coating composition comprising a mixture of chlorinated polyolefin-modified acrylic latex emulsion, polyurethane dispersion, non-gelling self-crosslinking acrylic emulsion, and glycol-based solvent, and
  b) drying the composition to form a hardened continuous film.

The disclosed compositions may be packaged in single pack configurations that may be dispensed and applied without requiring the addition of other ingredients, and which may be stored in such packages for a commercially desirable times (e.g., for three months or longer). The disclosed articles and methods provide a hardened polymeric film which may have one or more desirable features including adhesion to the underlying substrate, blocking resistance or chemical resistance.

BRIEF DESCRIPTION OF THE DRAWING

FIG. 1 is a schematic cross-sectional view of a coated article of the invention.

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The phrase "low VOC" when used with respect to a liquid coating composition means that the coating composition contains less than about 10 wt. % volatile organic compounds, more preferably less than about 7% volatile organic compounds, and most preferably less than about 4% volatile organic compounds based upon the total liquid coating composition weight.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The phrase "non-gelling" when used with respect to a self-crosslinking acrylic emulsion refers to an acrylic emulsion which, taken alone or together with crosslinkers present in the disclosed coating composition, does not gel when stored for at least three months in a sealed container at room temperature.

The phrase "shelf stable" when used with respect to a coating composition means that after storing the coating composition for at least three months in a sealed container at room temperature, the efflux time observed using an S90 ZAHN™ Signature Series Dip Viscosity Cup (from Paul N. Gardner Co.) is not more than twice the efflux time observed when the composition was prepared.

The phrase "topcoat" refers to a coating composition which when dried or otherwise hardened provides a decorative or protective outermost finish layer on a coated substrate. By way of further explanation, such topcoats may be applied in one or more layers and may be applied to bare or primer-coated substrates. The phrase "primer" refers to a coating composition that is applied in one or more layers to a bare substrate and which if left uncoated without a topcoat would not be capable of withstanding extended outdoor exposure (e.g., exposure equivalent to one year of vertical south-facing Florida sunlight) without visually objectionable deterioration.

Referring to FIG. 1, a coated article 10 of the invention is shown in schematic cross-sectional view. Article 10 includes a coating 14 made from the disclosed composition adjacent substrate 16. Coating 14 may be applied to substrate 16 in one or more layers which may be the same as or different from one another. Coating 14 desirably is both decorative and weather-resistant, and may be applied to article 10 at the location where substrate 16 is manufactured, at an intermediate location, or at a location where article 10 will be eventually be used (e.g., after substrate 16 has been attached to a building or other surface). Persons having ordinary skill in the art will appreciate that substrate 16 may have a variety of shapes, sizes and end uses.

A variety of chlorinated polyolefin-modified acrylic latex emulsions may be used in the disclosed coating compositions. Chlorinated polyolefin-modified acrylic latex emulsions normally contain at least particles of modified acrylic polymer, water and one or more surfactants, and may contain additional ingredients that will be familiar to persons having ordinary skill in the art. Representative chlorinated polyolefin-modified acrylic latex emulsions include the above-mentioned AROLON™ PW-5000 emulsion, HARDLEN™ EY-4052, HARDLEN EY-4036 and HARDLEN EY-4071 from Toyo Kasei Kogyo Co. Ltd., the chlorinated polyolefin-modified acrylic latex emulsions described in U.S. Pat. No. 6,277,912 B1, and mixtures thereof. Sufficient chlorinated polyolefin-modified acrylic latex emulsion should be used so that an experimentally significant improvement in adhesion to the desired substrate is observed compared to a composition that does not contain the emulsion. Excessive amounts of the emulsion may cause a reduction in the hardened film quality. Preferably the coating compositions contain about 15 to about 85 wt. % chlorinated polyolefin-modified acrylic latex emulsion, and more preferably about 25 to about 50 wt. %, based on total solids.

A variety of polyurethane dispersions may be used in the coating compositions. Polyurethane dispersions normally contain at least polyurethane particles and water, and may contain additional ingredients that will be familiar to persons having ordinary skill in the art. The polyurethane dispersion and the coating composition are preferably "NMP-free", that is, they preferably do not contain N-methyl pyrrolidone in amounts sufficient to require labeling or material safety data sheet listing under applicable regulations. Representative polyurethane dispersions include NMP-containing polyurethane dispersions such as ALBERDINGK™ APU 1012, ALBERDINGK APU 1014, ALBERDINGK APU 1035, ALBERDINGK APU 1060, ALBERDINGK APU 1061, ALBERDINGK APU 1062, ALBERDINGK APU 1068, ALBERDINGK CUR 60, ALBERDINGK CUR 69, ALBERDINGK CUR 99, ALBERDINGK U 325, ALBERDINGK U 3305, ALBERDINGK U 520, ALBERDINGK U 610, ALBERDINGK U 615, ALBERDINGK U 610, ALBERDINGK U 710, ALBERDINGK U 800, ALBERDINGK U 801, ALBERDINGK U 910, ALBERDINGK U 911, ALBERDINGK U 915, ALBERDINGK U 930 and ALBERDINGK U 933 polymer dispersions from Alberdingk Boley, Inc, and NMP-free polyurethane dispersions such as ALBERDINGK APU 10120 VP, ALBERDINGK APU 10140 VP, ALBERDINGK APU 10351 VP, ALBERDINGK APU 10600 VP, ALBERDINGK APU 10610 VP, ALBERDINGK APU 10620 VP, ALBERDINGK CUR 601 VP, ALBERDINGK CUR 991, ALBERDINGK U 3251, ALBERDINGK U 3300 VP, ALBERDINGK U 5200 VP, ALBERDINGK U 6100 VP, ALBERDINGK U 6150 VP, ALBERDINGK U 8001 VP, ALBERDINGK U 9150 VP, ALBERDINGK U 9152, ALBERDINGK U 9160 VP, ALBERDINGK U 9152, ALBERDINGK U 9160 VP and ALBERDINGK U 9800 VP polymer dispersions from Alberdingk Boley, Inc. and POSEIDON™ M AB-30F, POSEIDON AB-72F and POSEIDON AB-90F from Quaker Color. Mixtures of polyurethane dispersions may be employed. The polyurethane dispersion may help plasticize the chlorinated polyolefin-modified acrylic latex emulsion, and thus it may be desirable to use increased amounts of the polyurethane dispersion when increased amounts of chlorinated polyolefin-modified acrylic latex emulsion are employed. Preferably the coating compositions contain about 5 to about 50 wt. % polyurethane dispersion, and more preferably about 10 to about 20 wt. %, based on total solids.

A variety of non-gelling self-crosslinking acrylic emulsions may be used in the disclosed coating compositions. The self-crosslinking acrylic emulsion normally contains at least particles of acrylic polymer, water, and one or more emulsifiers. The self-crosslinking acrylic emulsion is different from the above-mentioned chlorinated polyolefin-modified acrylic latex emulsion. The self-crosslinking acrylic emulsion normally contains a suitable crosslinker such as diacetone acrylamide, a carbodiimide, an aziridine or other material capable of converting a 0.1 mm wet thickness film of the acrylic emulsion and crosslinker to a tack-free state when subjected to moderate heating, e.g., at 65° C. for fifteen minutes. A non-gelling self-crosslinking acrylic emulsion may also be provided by employing an acrylic emulsion that is not self-crosslinking but to which is added a suitable crosslinker, in the form of a separate ingredient in the disclosed coating compositions or as a crosslinker present in one of the other disclosed components. A crosslinker may also be added (as a separate ingredient or as a crosslinker present in one of the other disclosed components) to augment a crosslinker already present in a non-gelling self-crosslinking acrylic emulsion. The amounts and types of such crosslinker(s) are such that when in admixture with the acrylic emulsion, the admixture will be non-gelling for at least three months and a 0.1 mm thick wet film of the admixture subjected to moderate heating will form a tack-free film. The admixture preferably will be non gelling for at least six months, and preferably will fat al a tack-free film when heated at 65° C. for fifteen minutes. The self-crosslinking acrylic emulsion may contain additional ingredients that will be familiar to persons having ordinary skill in the art. Representative self-crosslinkable acrylic emulsions include ALBERDINGK AC 2514, ALBERDINGK AC 25142, ALBERDINGK AC 2518, ALBERDINGK AC 2523, ALBERDINGK AC 2524, ALBERDINGK AC 2537, ALBERDINGK AC 25381, ALBERDINGK AC 2544, ALBERDINGK AC 2546, ALBERDINGK MAC 24, and ALBERDINGK MAC 34 polymer dispersions from Alberdingk Boley, Inc.; EPS 2538 and EPS 2725 acrylic emulsions from EPS Corp.; RHOPLEX™ 3131-LO, RHOPLEX E-693, RHOPLEX E-940, RHOPT E-1011, RHOPLEX E-2780, RHOPT HG-95P, RHOPLEX HG-700, RHOPT FX HG-706, RHOPLEX PR-33, RHOPLEX TR-934HS, RHOPLEX TR-3349 and RHOPLEX™ VSR-1050 acrylic emulsions from Rohm and Haas Co.; RHOSHIELD™ 636 and RHOSHIELD 3188 polymer dispersions from Rohm and Haas Co.; JONCRYL™ 1972, JONCRYL 1980, JONCRYL 1982, JONCRYL 1984 and JONCRYL 8383 acrylic emulsions from BASF Corp.; NEOCRYL™ A-1127, NEOCRYL A-6115, NEOCRYL XK-12, NEOCRYL XK-90, NEOCRYL XK-98 and NEOCRYL XK-220 acrylic latex polymers from DSM NeoResins, Inc., and mixtures thereof. Preferably the coating compositions contain about 10 to about 80 wt. % self-crosslinkable acrylic emulsion, and more preferably about 30 to about 65 wt. %, based on total solids.

A variety of glycol solvents may be used in the coating compositions. The glycol solvent helps reduce viscosity and may aid wetting or film coalescence. Representative glycol solvents include ethylene glycol, ethylene glycol methyl ether, ethylene glycol ethyl ether, ethylene glycol monobutyl ether, ethylene glycol-2-ethylhexyl ether, propylene glycol, propylene glycol methyl ether, propylene glycol ethyl ether, propylene glycol monobutyl ether, propylene glycol-2-ethylhexyl ether, diethylene glycol, diethylene glycol methyl ether, diethylene glycol ethyl ether, diethylene glycol monobutyl ether, diethylene glycol-2-ethylhexyl ether, dipropylene glycol, dipropylene glycol methyl ether, dipropylene glycol ethyl ether, dipropylene glycol monobutyl ether, dipropylene glycol-2-ethylhexyl ether, and mixtures thereof. Hydrophilic glycol solvents (e.g., propylene glycol methyl ether or dipropylene glycol monomethyl ether) are preferred. Mixtures (e.g., mixtures of dipropylene glycol monomethyl ether and ethylene glycol monobutyl ether) may provide better wetting on some substrates than will be obtained when only a single glycol solvent is employed, and may help discourage changes in coating composition viscosity during storage. For example, coating compositions containing only ethylene glycol butyl ether may exhibit an unacceptably high viscosity increase in the span of a few days or weeks, whereas replacing part of the ethylene glycol butyl ether with another glycol solvent such as dipropylene glycol monomethyl ether may greatly reduce the extent to which viscosity increases occur. Selection of such mixtures may be made empirically, preferably using a clear coating composition prepared without pigments since such clear coating compositions appear to be more susceptible than pigmented coating compositions to viscosity increases when stored. Preferably the coating compositions contain about 25 to about 80 wt. % glycol solvent(s), and more preferably about 30 to about 65 wt. %, based on total solids.

The coating compositions normally will contain water, as a component of the starting materials or as an added ingredient. Preferably the coating composition contains sufficient water so that about 20 to about 80 wt. % solids and more preferably about 35 to about 55 wt. % solids are present when the composition is applied to a substrate.

The coating compositions may contain additional reactive or nonreactive monomers, oligomers or polymers, crosslinkers, catalysts or initiators. For example, the addition of a low viscosity reactive epoxide diluent (e.g., HELOXY™ Modifier 48 from Resolution Performance Products added at approximately the same solids weight as the chlorinated polyolefin-modified acrylic latex solids) and an optional catalyst (e.g., adipic dihydrazide from Kowa American Corp. added at approximately 0.3% based on the total composition solids) may provide an improvement in alcohol or methyl ethyl ketone double rub resistance.

The coating compositions may contain a variety of other adjuvants that will be familiar to persons having ordinary skill in the art. Representative adjuvants are described in Koleske et al., Paint and Coatings Industry, April, 2003, pages 12-86, and may include surfactants (e.g., in addition to those which may be present in the acrylic emulsion starting materials), pigments, colorants, dyes, dispersants, defoamers, thickeners (e.g., hydrophobic ethoxylated urethane resin (HEUR) thickeners, and hydrophobically-modified, alkali-soluble or alkali-swellable emulsion (HASE) thickeners), heat stabilizers, leveling agents, coalescents (e.g., in addition to the glycol ethers), biocides, mildewcides, anti-cratering agents, curing indicators, plasticizers, fillers, sedimentation inhibitors, waxes, ultraviolet light absorbers, optical brighteners, and the like. The use of a filler such as talc and a wax such as an oxidized polyethylene wax homopolymer may help improve mar resistance. The types and amounts of these and other adjuvants typically will be empirically selected for use with the particular application and curing equipment at a given manufacturing site. The types and amounts of the glycol solvent(s) and other ingredients in the coating composition desirably are selected so that the coating composition is shelf stable for at least three months, at least four months, at least five months or at least six months when stored in single pack form in a sealed container at room temperature.

For some applications it will be desirable to combine the above-described polyurethane dispersion, self-crosslinking acrylic emulsion and glycol solvent (viz., to exclude the chlorinated polyolefin-modified acrylic latex emulsion) and use the resulting mixture as a primer over which may be applied a topcoat of the disclosed coating composition containing the chlorinated polyolefin-modified acrylic latex emulsion. Preferably such a primer contains about 5 to about 50 wt. % and more preferably about 10 to about 20 wt. % polyurethane dispersion based on total solids; about 10 to about 80 wt. % and more preferably about 30 to about 65 wt. % self-crosslinkable acrylic emulsion based on total solids; about 10 to about 50 wt. % and more preferably about 15 to about 30 wt. % glycol solvent based on total resin solids; and sufficient water so that about 20 to about 80 wt. % solids and more preferably about 35 to about 55 wt. % solids are present when the primer is applied to a substrate.

The disclosed coating compositions may be applied to a variety of substrates. Representative plastic substrates include PVC, polystyrene (PS), thermoplastic polyolefins (TPOs) including polyethylene (PE) and polypropylene (PP), acrylonitrile-butadiene-styrene (ABS), polycarbonate (PC), nylon, polyethylene terephthalate (PET) and other polyesters including filled polyesters such as fiberglass. The plastic substrate may have a bare (viz., unprimed) or previously-coated (e.g., primed or topcoated) surface. Representative wood substrates include hardwood species such as ash, birch, cherry, mahogany, maple, oak, poplar, teak, hickory and walnut, and softwood species such as cedar, fir, pine and redwood. The wood substrate may be solid or veneered, and may have a raw (viz., not primed or treated) surface or a surface that has been treated or coated with a variety of compositions including the above-mentioned waxy preservative treatments. The disclosed compositions may be applied using a variety of methods that will be familiar to those skilled in the art, including spraying, brushing, roller coating, flood coating and dipping. The compositions may be applied at a variety of wet film thicknesses. Preferably the wet film thickness is such as to provide a dry film thickness of about 13 to about 130 µm (about 0.5 to about 5 mil) and more preferably about 25 to about 75 µm (about 1 to about 3 mil) for the hardened coating. The applied coating may be hardened using a variety of drying devices that will be familiar to persons having ordinary skill in the art. Preferred heating temperatures for hardening the coating compositions are about 50° to about 65° C., and more preferably about 60° to about 65° C., and preferred heating times are less than 15 minutes, less than 10 minutes, less than six minutes or less than five minutes.

The disclosed coated articles may be used for a variety of purposes. Representative end-use applications include architectural elements such as windows, doors, moldings and jambs and other elements used on or around openings; furniture; kitchen cabinetry; engineered flooring; and marine trim or components.

The cured coating compositions may be evaluated using a variety of tests including those described below:

Hot Adhesion

Immediately after removing a coated substrate from the curing oven, a fingernail is used to make or attempt to make a 5 cm long scratch in the coating. The coated panels are rated as follows:
1—No film (coating completely removed).
2—Coating is easily removed but leaves a film.
3—Coating is removed over more than 1 mm but less than one half the distance scratched.
4—Coating is removed over less than 1 mm.
5—No delamination of paint (no coating removed).

X-Scribe Adhesion

An X-ACTO™ knife (from Elmer's Products, Inc) was used to make an x-scribe pattern on the cured coating composition. 3M™ No. 250 Tape (from 3M Company) was applied over the scribe pattern, pressed to remove bubbles and stripped away. A visual evaluation was used to determine if coating delamination occurred. The coated panels were rated according to the same 1 to 5 scale used for Hot Adhesion testing.

Flow and Leveling

The manner in which the paint atomized and leveled during spraying is subjectively evaluated. The coated panels are ranked relative to one another on a 1 to 5 scale, with a 1 rating representing poor breakup and an undulated film, and a 5 rating representing good atomization and a smooth film.

Gloss

Cured coating gloss is measured using a 60° gloss meter and the procedures of ASTM D 523.

Blocking

Using C clamps, 10 cm×10 cm coated substrates are clamped face to face by closing the clamps one complete turn beyond the point of initial substrate contact. The clamped coated panels are placed in a 52° C. oven for 24 hours, then removed and rated on a 1 to 10 scale as follows:
1—Panels can not be pried apart.
2—Panels require a tool to be pried apart.
3—Panels stuck with a glossy pressure spot and paint transfer.
4—Panels stuck with a glossy pressure spot and no paint transfer.
5—Panels stuck, but can be pried apart by hand with no glossy pressure spot and no paint transfer.
6—Panels exhibit slight cohesion with a glossy pressure spot and paint transfer.
7—Panels exhibit slight cohesion with a glossy pressure spot and no paint transfer.
8—Panels exhibit slight cohesion with no glossy pressure spot or paint transfer.
9—Panels fall apart when opened and have a glossy pressure spot.
10—Panels fall apart when opened without a glossy pressure spot, paint transfer or other noticeable defect.

Detergent Resistance

Using (except as shown below) the Detergent Resistance procedure described in American Architectural Manufacturers Association (AAMA) Voluntary Specification 613, coated substrate panels are soaked for 72 hours at 38° C. in a 3% detergent solution, removed from the detergent, rinsed with water, wiped dry and allowed to recover at room temperature for 15 minutes. Once dry, the entire coated portion of the soaked panel is scribed with an X, taped with PERMACEL™ 99 polyester/fiber packaging tape (from Permacel), and evaluated to make sure that all entrapped air bubbles have been removed. The tape is sharply pulled off at a right angle to the coated substrate, and the coated panels are rated on a 0 to 5 scale as follows:
0—Coating removed from panel
1—Coating remains on panel but in a wet, gummy state.
2—Some coating removed from panel and some white residue on tape.
3—Coating not removed from panel, lots of white residue on tape.
4—Coating not removed from panel, some white residue on tape.
5—Coating not removed from panel and nothing showing on the tape.

Efflux Time

An S90 ZAHN Signature Series Dip Viscosity Cup is held by its bail and immersed into a sample of the coating composition at 25° C. The cup is held vertically by inserting an index finger into the bail, and the cup is lifted from the coating composition using a quick, steady motion. A timer is started when top edge of the cup breaks the surface. The cup is held no more than 150 mm above the sample and the 25 mm long portion of the stream immediately beneath the cup outlet is examined. The timer is stopped when the first definite break is observed in that 25 mm stream portion.

The invention is further illustrated in the following non-limiting examples, in which all parts and percentages are by weight unless otherwise indicated.

Examples 1-2

The ingredients shown below in Table 1 were combined in the listed order and mixed to provide uniform dispersions:

TABLE 1

| Ingredient or Step | Example 1 | Example 2 |
|---|---|---|
| Water | 128.9 | 114.6 |
| Dipropylene glycol monomethyl ether glycol solvent | 30 | 29.1 |
| Nonionic HEUR thickener | 3.3 | 27.2 |
| Dispersant | 20.9 | 20.3 |
| Polyether siloxane defoamer | 1.5 | 1.5 |
| Nonionic surfactant | 6.2 | 6 |
| Fungicide | | 4 |
| Titanium dioxide pigment | 458 | 444.5 |
| Talc | 17.3 | 16.8 |
| Oxidized polyethylene wax homopolymer | 5.25 | 5.1 |
| Water | 12.6 | 11.5 |
| (The above ingredients constituted a grind to which was added the following letdown): | | |
| dipropylene glycol monomethyl ether glycol solvent | 53.82 | 52.2 |
| Ethylene glycol butyl ether solvent | 20.88 | 20.3 |
| JONCRYL 1982 self-crosslinking acrylic emulsion | 218.48 | 212 |
| POSEIDON AB-72F polyurethane dispersion | 63.6 | 61.7 |
| AROLON PW-5000 chlorinated polyolefin-modified acrylic emulsion | 154.52 | 149.9 |
| Silicone defoamer | | 0.8 |
| Silicone surfactant | 3.75 | 3.6 |
| Water | | 6 |
| HASE thickener | | 3 |

Example 3

Using the method of Examples 1-2, the ingredients shown below in Table 2 were combined to provide a pigmented coating composition:

TABLE 2

| Ingredient or Step | Example 3 |
|---|---|
| Water | 91.79 |
| Ethylene glycol butyl ether solvent | 14.73 |
| Pigment wetting and dispersing agent | 7.47 |
| Nonionic surfactant | 4.78 |
| Dimethylethanolamine | 2.19 |
| Nonionic HEUR thickener | 0.25 |
| Polyether siloxane defoamer | 0.40 |
| Titanium dioxide pigment | 388.54 |
| Water | 9.66 |
| (The above ingredients constituted a grind to which was added the following letdown): | |
| POSEIDON AB-72F polyurethane dispersion | 82.93 |
| 7 μm silica | 6.47 |
| JONCRYL 1982 self-crosslinking acrylic emulsion | 276.55 |
| AROLON PW-5000 chlorinated polyolefin-modified acrylic emulsion | 193.63 |
| Dipropylene glycol monomethyl ether glycol solvent | 57.94 |

TABLE 2-continued

| Ingredient or Step | Example 3 |
|---|---|
| 4:1 Mixture of water and rheology modifier/antisettling agent | 1.25 |
| Silicone surfactant | 3.88 |

Example 4

Using the method of Examples 1-3, the ingredients shown below in Table 3 were combined to provide a pigmented coating composition:

TABLE 3

| Ingredient or Step | Example 4 |
|---|---|
| Water | 44.48 |
| Pigment wetting and dispersing agent | 13.56 |
| Polyether siloxane defoamer | 0.37 |
| Nonionic surfactant | 4.94 |
| Titanium dioxide pigment | 270.52 |
| Water | 8.23 |
| Nonionic HEUR thickener | 4.62 |
| (The above ingredients constituted a grind which was added to the following letdown): | |
| 25.40:18.44:73.77 mixture of water, ethylene glycol butyl ether solvent and dipropylene glycol monomethyl ether glycol solvent | 117.61 |
| POSEIDON AB-72F polyurethane dispersion | 84.76 |
| JONCRYL 1982 self-crosslinking acrylic emulsion | 282.52 |
| AROLON PW-5000 chlorinated polyolefin-modified acrylic emulsion | 195.80 |
| (Next the following ingredients were added to the grind:letdown mixture): | |
| Water | 8.23 |
| Silicone surfactant | 4.94 |
| 5.9:1.99 mixture of water and nonionic HEUR thickener | 7.89 |
| Lampblack | 0.60 |
| Yellow iron oxide | 2.45 |

Cured Coating Evaluations

The Example 1 through Example 4 coating compositions were applied to PVC architectural molding substrates using an airless spray system for the Example 1 coating composition, a fan coater for the Example 2 coating composition, and a high volume, low pressure (HVLP) spray system for the Example 3 and Example 4 coating compositions. The coatings were applied at wet film thicknesses sufficient to provide a 44 μm (1.75 mil) dry film thickness, and cured by heating at 60-65° C. for five minutes. The cured coatings were evaluated for Hot Adhesion, Flow and Leveling, Gloss, Blocking and Detergent Resistance. The results are shown below in Table 4

TABLE 4

| Coating Composition | Hot Adhesion (Rated 1-5) | Flow & Leveling (Rated 1-5) | 60° Gloss | Blocking (Rated 1-10) | Detergent Resistance (Rated 0-5) |
|---|---|---|---|---|---|
| Example 1 | 5 | 5 | 8.4 | 10 | 5 |
| Example 2 | 5 | 5 | 16.9 | 10 | 5 |
| Example 3 | 5 | 5 | 6.4 | 10 | 5 |
| Example 4 | 5 | 5 | 38.9 | 10 | 5 |

The results in Table 4 show that the tested coatings provided excellent Hot Adhesion, Flow and Leveling, Blocking and Detergent Adhesion performance, and a desirable range of Gloss values, on PVC substrates.

The Example 4 coating composition was also applied to pine used in manufacturing window sashes. The pine had been treated with a wax-based preservative. The coating composition was applied at a wet film thickness sufficient to provide a 50 μm (2 mil) dry film thickness, and cured by heating at 60-65° C. for five minutes. The cured coating was evaluated for X-Scribe Adhesion, Gloss, Blocking and Detergent Resistance. The results are shown below in Table 5:

TABLE 5

| Coating Composition | Dry Film Thickness | X-Scribe Adhesion (Rated 1-5) | 60° Gloss | Blocking (Rated 1-10) | Detergent Resistance (Rated 0-5) |
|---|---|---|---|---|---|
| Example 4 | 50 μm | 5 | 13-15 | 10 | 5 |

The results in Table 5 show that on a wax-treated pine substrate, the tested coating provided excellent resistance to delamination, blocking and detergent, and a low gloss appearance.

Comparison Examples 1-2

The ingredients shown below in Table 6 were combined in the listed order and mixed to provide uniform dispersions:

TABLE 6

| Ingredient or Step | Comparison Example 1 | Comparison Example 2 |
|---|---|---|
| Water | 164.98 | 185.69 |
| Nonionic HEUR thickener | 29.96 | 33.72 |
| Dispersant | 16.98 | 19.11 |
| Polyether siloxane defoamer | 1.0 | 1.12 |
| Nonionic surfactant | 4.99 | 5.62 |
| Titanium dioxide pigment | 371.61 | |
| Talc | 14.48 | 16.30 |
| Oxidized polyethylene wax homopolymer | 4.29 | 4.83 |
| Water | 19.97 | 22.48 |
| (The above ingredients constituted a grind to which was added the following letdown): | | |
| Water | 19.97 | 7.56 |
| Ethylene glycol butyl ether solvent | 85.09 | 12.75 |
| JONCRYL 1982 self-crosslinking acrylic emulsion | 177.27 | 23.2 |
| POSEIDON AB-72F polyurethane dispersion | 51.63 | 6.84 |
| AROLON PW-5000 chlorinated polyolefin-modified acrylic emulsion | 125.33 | 16.12 |
| Silicone surfactant | 2.50 | 0.34 |

The Comparison Example 1 coating composition provided a white pigmented coating, and the Comparison Example 2 coating composition provided a clear unpigmented coating. Over the next seven months, the Comparison Example 1 and Comparison Example 2 coating compositions were evaluated to determine their viscosities when stored at room temperature, and the efflux times shown below in Table 7 and Table 8 were obtained:

TABLE 7

| | Efflux Time (seconds) at Day No. | | | | | | | | | |
|---|---|---|---|---|---|---|---|---|---|---|
| Sample | 1 | 2 | 3 | 4 | 5 | 6 | 7 | 8 | 9 | 10 |
| Comp. Ex. 1 | 17.88 | 18.22 | 21.47 | 21.97 | 21.06 | 22.78 | 24.53 | 25.37 | 25.9 | 26.88 |
| Comp. Ex. 2 | 23.59 | 29.97 | 34.28 | 40.09 | 61.04 | 108 | 114 | 114 | 126 | 136 |

TABLE 8

| | Efflux Time (seconds) at Month No. | | | | | | |
|---|---|---|---|---|---|---|---|
| Sample | 1 | 2 | 3 | 4 | 5 | 6 | 7 |
| Comp. Ex. 1 | 36.71 | 37.68 | 44.59 | 54.75 | 72 | 90 | 120 |
| Comp. Ex. 2 | 150 | 192 | 236 | 300 | 350 | 370 | 430 |

As shown in Tables 7 and 8, the efflux time for the pigmented composition of Comparison Example 1 more than doubled after one month of storage, and the efflux time for the unpigmented composition of Comparison Example 2 more than doubled after only five days of storage. Both the Comparison Example 1 and Comparison Example 2 coating compositions contained ethylene glycol butyl ether as the sole glycol solvent. The Example 1 through Example 4 coating compositions contained a mixture of dipropylene glycol monomethyl ether and ethylene glycol butyl ether as the glycol solvents, and exhibited much better shelf life than the Comparison Example coating compositions. For example, the efflux Time for the Example 1 coating composition will change from approximately 18-20 seconds at the time of preparation to approximately 25-26 seconds after three months of storage.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A coating composition comprising a mixture of:
    a) chlorinated polyolefin-modified acrylic latex emulsion,
    b) polyurethane dispersion
    c) non-gelling self-crosslinking acrylic emulsion, and
    d) glycol-based solvent,
wherein the composition contains sufficient non-gelling self-crosslinking acrylic emulsion and glycol-based solvent so that a 0.1 mm wet thickness layer of the composition will form a tack-free film when heated at 65° C. for fifteen minutes, and the glycol-based solvent is selected so that the coating composition is shelf stable.

2. A coating composition according to claim 1 wherein the self-crosslinking acrylic emulsion comprises a crosslinker capable of converting a 0.1 mm wet thickness film of the acrylic emulsion and crosslinker to a tack-free state when heated at 65° C. for fifteen minutes.

3. A coating composition according to claim 2 wherein the crosslinker comprises diacetone acrylamide.

4. A coating composition according to claim 2 wherein the crosslinker comprises a carbodiimide or an aziridine.

5. A coating composition according to claim 1 wherein the glycol solvent is hydrophilic.

6. A coating composition according to claim 1 wherein the glycol solvent comprises ethylene glycol, ethylene glycol methyl ether, ethylene glycol ethyl ether, ethylene glycol monobutyl ether, ethylene glycol-2-ethylhexyl ether, propylene glycol, propylene glycol methyl ether, propylene glycol ethyl ether, propylene glycol monobutyl ether, propylene glycol-2-ethylhexyl ether, diethylene glycol, diethylene glycol methyl ether, diethylene glycol ethyl ether, diethylene glycol monobutyl ether, diethylene glycol-2-ethylhexyl ether, dipropylene glycol, dipropylene glycol methyl ether, dipropylene glycol ethyl ether, dipropylene glycol monobutyl ether, dipropylene glycol-2-ethylhexyl ether, or mixture thereof.

7. A coating composition according to claim 1 wherein the glycol solvent comprises a mixture of dipropylene glycol monomethyl ether and ethylene glycol monobutyl ether.

8. A coating composition according to claim 1 further comprising a low viscosity reactive epoxide diluent and polymerization catalyst.

9. A coating composition according to claim 1 which does not contain N-methyl pyrrolidone.

10. A coating composition according to claim 1 containing sufficient water so that about 20 to about 80 wt. % solids are present when the composition is applied to a substrate.

11. A coating composition according to claim 1 containing sufficient water so that about 35 to about 55 wt. % solids are present when the composition is applied to a substrate.

12. A coating composition according to claim 1 containing about 15 to about 85 wt. % chlorinated polyolefin-modified acrylic latex emulsion, about 5 to about 50 wt. % polyurethane dispersion, about 10 to about 80 wt. % self-crosslinkable acrylic emulsion and about 25 to about 80 wt. % glycol solvent, based on total solids.

13. A coating composition according to claim 1 containing about 25 to about 50 wt. % chlorinated polyolefin-modified acrylic latex emulsion, about 10 to about 20 wt. % polyurethane dispersion, about 30 to about 65 wt. % self-crosslinkable acrylic emulsion and about 30 to about 65 wt. % glycol solvent, based on total solids.

14. A coating composition according to claim 1 having at least three months shelf stability when stored in single pack form at room temperature.

15. A coated article comprising a substrate having thereon a hardened continuous coating obtained from a shelf stable mixture of chlorinated polyolefin-modified acrylic latex emulsion, polyurethane dispersion, non-gelling self-crosslinking acrylic emulsion, and glycol-based solvent.

16. A coated article according to claim 15 comprising a plastic substrate.

17. A coated article according to claim 15 wherein the substrate comprises polyvinyl chloride.

18. A coated article according to claim 15 wherein the substrate comprises polystyrene, thermoplastic polyolefin, acrylonitrile-butadiene-styrene, polycarbonate, nylon or polyester.

19. A coated article according to claim 15 comprising a wood substrate.

20. A coated article according to claim 19 wherein the wood has been treated with a wax-containing preservative.

21. A method for coating a plastic or wooden substrate, which method comprises:
   a) applying to the substrate a layer of a shelf stable coating composition comprising a mixture of chlorinated polyolefin-modified acrylic latex emulsion, polyurethane dispersion, non-gelling self-crosslinking acrylic emulsion, and glycol-based solvent, and
   b) drying the composition to form a hardened continuous film.

22. A method according to claim 21 wherein the substrate comprises plastic and the composition is dried at a temperature no greater than about 65° C.

23. A method according to claim 21 wherein the substrate comprises wood treated with a wax-containing preservative.

24. A method according to claim 21 wherein the self-crosslinking acrylic emulsion comprises a crosslinker capable of converting a 0.1 mm wet thickness film of the acrylic emulsion and crosslinker to a tack-free state when heated at 65° C. for fifteen minutes.

25. A method according to claim 24 wherein the crosslinker comprises diacetone acrylamide.

26. A method according to claim 21 wherein the composition has at least three months shelf stability when stored in single pack form at room temperature.

27. A method according to claim 21 comprising drying the composition at about 50° to about 65° C. in less than 15 minutes.

28. A method according to claim 21 wherein the hardened film has a dry film thickness of about 13 to about 130 µm.

* * * * *